US009629196B2

(12) United States Patent
Lamberton et al.

(10) Patent No.: US 9,629,196 B2
(45) Date of Patent: Apr. 18, 2017

(54) METHOD OF MANAGING THE CONNECTIVITY OF A TERMINAL

(71) Applicant: BUZZINBEES, Seyssinet Pariset (FR)

(72) Inventors: Marc Lamberton, Antibes (FR); Michel Anslot, Mougins (FR); Gilles Coppe, Valbonne (FR); Philippe Bouckaert, Biot (FR)

(73) Assignee: Buzzinbees, Seyssinet Pariset (FR)

( * ) Notice: Subject to any disclaimer, the term of this patent is extended or adjusted under 35 U.S.C. 154(b) by 22 days.

(21) Appl. No.: 14/365,012

(22) PCT Filed: Dec. 12, 2012

(86) PCT No.: PCT/EP2012/075282
§ 371 (c)(1),
(2) Date: Jun. 12, 2014

(87) PCT Pub. No.: WO2013/087720
PCT Pub. Date: Jun. 20, 2013

(65) Prior Publication Data
US 2015/0105059 A1 Apr. 16, 2015

(30) Foreign Application Priority Data

Dec. 12, 2011 (FR) ..................................... 11 61492

(51) Int. Cl.
*H04M 1/66* (2006.01)
*H04W 76/04* (2009.01)
(Continued)

(52) U.S. Cl.
CPC .......... *H04W 76/04* (2013.01); *H04L 41/0866* (2013.01); *H04L 63/102* (2013.01);
(Continued)

(58) Field of Classification Search
CPC ....... H04W 12/08; H04W 84/12; H04W 4/22; H04W 74/0891; H04W 12/06;
(Continued)

(56) References Cited

U.S. PATENT DOCUMENTS 6,978,156 B1 12/2005 Papadopoulos et al.
8,260,917 B1 9/2012 Manikowski et al.
(Continued)

FOREIGN PATENT DOCUMENTS

EP  0 71 1090   5/1996
EP  1296529     3/2003
(Continued)

OTHER PUBLICATIONS

European Patent Office International Search Report and Written Opinion for PCT/EP2012/075280 dated May 29, 2013, Applicant, Buzzinbees (10 pages).

(Continued)

*Primary Examiner* — Ronald Eisner
(74) *Attorney, Agent, or Firm* — McCracken & Gillen LLC

(57) ABSTRACT

The invention proposes in particular a method of managing the connectivity of a terminal connectable to a cellular communication network characterized in that it comprises the following steps carried out in the terminal:
if the terminal is already connected to the network:
  on completion of the dispatching of messages or after a predetermined duration following the dispatching of messages, determining whether conditions of configurations required in order to maintain a connection of the terminal to the network are all satisfied,
  maintaining the connection of the terminal to the network and authorizing the dispatching of the messages only if the conditions of configurations required to establish a
(Continued)

Figure 1:
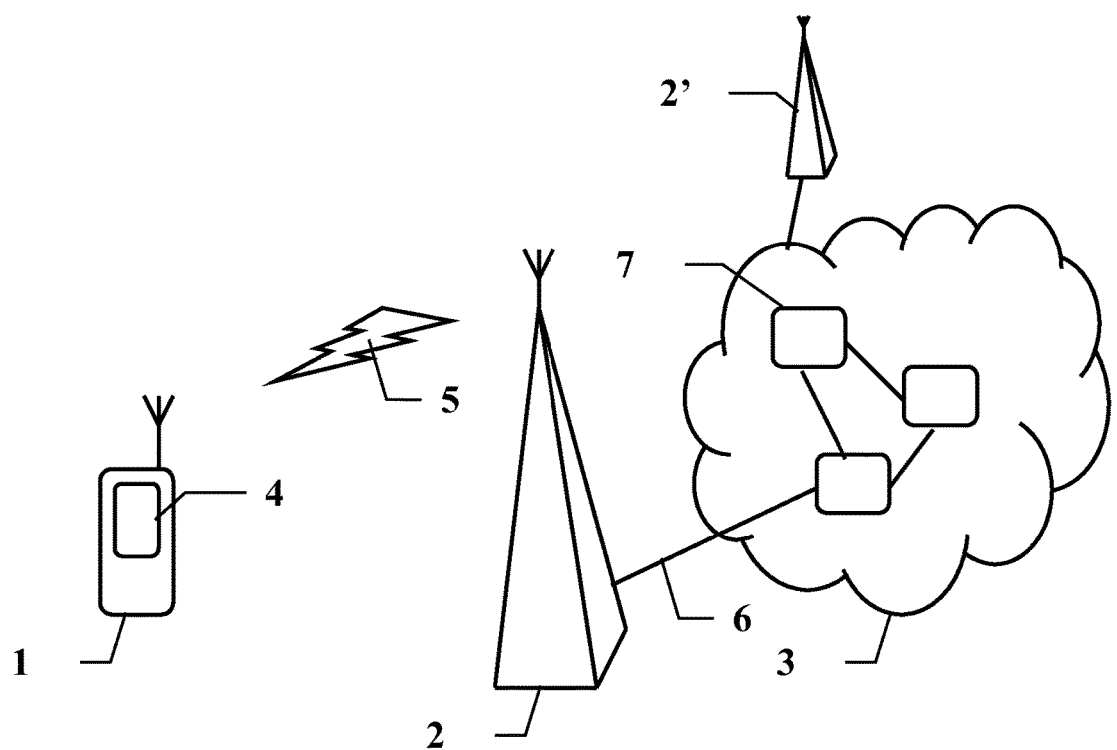

connection of the terminal to the network are all satisfied, otherwise interrupting the connection of the terminal to the network, receiving from a management module remote from the terminal a signalling message ordering a disconnection of the terminal.

Furthermore, the invention also pertains to a computer program product able to execute the method of managing connectivity.

32 Claims, 2 Drawing Sheets

(51) Int. Cl.
| | | |
|---|---|---|
| *H04L 29/06* | (2006.01) | |
| *H04W 4/00* | (2009.01) | |
| *H04W 12/08* | (2009.01) | |
| *H04L 12/24* | (2006.01) | |
| *H04W 48/02* | (2009.01) | |

(52) U.S. Cl.
 CPC .......... *H04W 4/005* (2013.01); *H04W 12/08* (2013.01); *H04W 48/02* (2013.01)

(58) Field of Classification Search
 CPC . H04W 12/10; H04W 24/08; H04W 36/0027; H04W 4/14; H04W 56/00; H04W 74/002; H04W 74/0833; H04W 76/02; H04W 88/02; H04W 12/00
 USPC .......... 455/26.1, 410–415, 565, 456.4, 550.1
 See application file for complete search history.

(56) References Cited

U.S. PATENT DOCUMENTS

| | | | |
|---|---|---|---|
| 2003/0125085 A1* | 7/2003 | Collins | ................... H04W 8/12 455/560 |
| 2003/0129991 A1 | 7/2003 | Allison et al. | |
| 2005/0152275 A1 | 7/2005 | Laurila et al. | |
| 2007/0293216 A1 | 12/2007 | Jiang | |
| 2008/0102866 A1 | 5/2008 | Fiorillo et al. | |
| 2008/0119166 A1* | 5/2008 | Zhu | ................... H04W 12/06 455/411 |
| 2008/0234004 A1* | 9/2008 | Loque | ............... H04L 29/12188 455/564 |
| 2009/0061860 A1* | 3/2009 | Jiang | .................. H04M 3/2281 455/433 |
| 2009/0325558 A1 | 12/2009 | Pridmore et al. | |
| 2011/0019626 A1 | 1/2011 | Karaoguz et al. | |
| 2011/0199905 A1* | 8/2011 | Pinheiro | ............... H04W 4/005 370/235 |
| 2011/0292923 A1 | 12/2011 | Noldus | |
| 2012/0077546 A1* | 3/2012 | Kawa | .................... H04W 4/001 455/566 |
| 2012/0164975 A1 | 6/2012 | Dodeja et al. | |
| 2012/0238257 A1* | 9/2012 | Anson | ................... H04W 4/021 455/418 |
| 2013/0122905 A1* | 5/2013 | Casati | ................... H04W 60/06 455/435.1 |

FOREIGN PATENT DOCUMENTS

| | | |
|---|---|---|
| EP | 2 385 734 | 5/2010 |
| EP | 2 192 807 | 6/2010 |
| EP | 2 265 067 | 12/2010 |
| GB | 2 327 570 | 1/1999 |
| WO | WO 99/63774 | 5/1999 |

OTHER PUBLICATIONS

"Dynamic SIM Allocation™", A new way to activate prepaid SIM cards, Evolving Systems®, (2 pages).

European Patent Office International Search Report and Written Opinion for PCT/EP2012/075282 dated Apr. 3, 2013, Applicant, Buzzinbees, (11 pages).

MCTEL EIR, Equipment Identity Register (2 pages).

3GPP, "3rd Generation Partnership Project; Technical Specification Group Services and System Aspects; System Improvements for Machine-Type Communications"; 3GPP TR 23.888, V1.1.0, dated Mar. 14, 2011 (84 pages).

Beckmann, Chris et al., "Some Assembly Required: Supporting End-User Sensor Installation in Domestic Ubiquitous Computing Environments", Intel Research Seattle, Mar. 14, 2011, pp. 107-124 (18 pages).

International Search Report and Written Opinion for PCT/EP2013/053407 dated Jul. 24, 2013, Applicant, Buzzinbees, (13 pages).

ETSI, Digital cellular telecommunications system (Phase 2+) (GSM); Universal Mobile Telecommunications System (UMTS); Technical Report on the Gateway Location Register; (3GPP TR23.909 version 4.0.0 Release 4; vol. 3; Mar. 1, 2001 (62 pages).

* cited by examiner

METHOD OF MANAGING THE CONNECTIVITY OF A TERMINAL

The technical field of the invention is that of cellular communication networks. More particularly the invention aims to optimise the use of radio-frequency resources of such a network by disconnecting a terminal as soon as the connection thereof is no longer necessary. The invention is particularly advantageous for intermachine applications, where a cellular communication network is employed to communicate between machine terminals An intermachine environment refers to an environment comprising systems, both cabled and wireless, for communicating between machine terminals. A machine terminal is typically a sensor capable of making a measurement. This measurement is transmitted via the communication network to another machine terminal responsible for compiling this measurement with other measurements with a view to processing thereof.

Modern intermachine environments take advantage of the various existing types of communication network, and particularly cellular communication networks, advantageous because of the great spatial availability thereof.

One particularity of an intermachine communication is that it requires a low bit rate per machine terminal: a measurement for example can be transmitted in a single byte, and at a short period, of around one hour or one day. This bit rate can be evenly spread out over a period of time that is usually very long. However, an intermachine application usually involves a very large number of machine terminals.

A machine terminal, like a telephone terminal, is connected to a cell in a cellular communication network in order to be able to transmit a data item, such as a value of a measurement made. The problem stems from the fact that a cell can manage only a limited number of terminals connected simultaneously, telephone terminals and/or machine terminals.

A cell is currently sized for telephone/voice connections that require a high bit rate, for a continuous period of around a few minutes or tens of minutes. The charging model, or volume transmitted, is adapted to this type of connection, so that it is profitable for the operator.

If all the machine terminals, numerous within an intermachine application, remain permanently connected to a cell, this requires a drastic increase in the capacity of said cell.

An increase in the size/capacity of a cell, or of the cell density, in order to accommodate a very large number of machine terminals in an intermachine application, could not be compensated for by relatively low bit rates caused by such an intermachine application, and cannot be considered to be profitable by operator.

The objective of the present invention is to afford a solution to this drawback.

One subject matter of the present invention is a method for managing the connectivity of a terminal that can be connected to a cellular communication network, the steps of the method being executed directly on the terminal and being configured to manage the connectivity of said terminal.

This solution makes it possible to manage the connectivity of said terminals, by connecting/disconnecting each terminal according to requirements, so that a terminal does not unnecessarily remain connected when it has no data to transmit.

This solution is particularly advantageous as will be detailed below.

In the context of the present invention, it has turned out that, in order to deal with an increase in the number of terminals while keeping a current cell, it is necessary to adapt the operating mode of said intermachine application. One means of limiting the number of machine terminals connected at a given moment, in order not to exceed the instantaneous capacity of a cell, consists of not connecting an excessively large number of machine terminals at the same time. This may advantageously be achieved by connecting a machine terminal only during a period necessary for the transmission of the data.

For this purpose it is necessary to manage the connectivity of said terminals in order to interrupt the connection of the terminal when the data have already been transmitted or when the next data will not be transmitted before a long period of time, typically before a period of time of several minutes.

One solution envisaged in the context of the development of the present invention consists of managing the connectivity of a terminal that can be connected to the cellular communication network from the cellular communication network. In this case a module of the network is responsible for disconnecting a terminal when the latter is inactive. To do this, said module sends a signalling message controlling a disconnection to the module or modules in the network responsible for managing the connection with the terminal. Thus, for example in a GSM network, the module responsible for managing the radio link with a terminal, the base station controller module or BSC, receives such a command and then disconnects the terminal.

Such an approach is relatively satisfactory, but does present certain limitations identified in the context of the development of the present invention. In particular, it has proved that such an approach gives rise to a high load for said module, which may have to manage a large number of terminals. In addition such an approach almost necessarily involves a centralised approach. In addition such a module is often ill placed to know when it is necessary to disconnect a terminal. This is because the module has no means of knowing whether or not the terminal is getting ready to send data. In addition, such an approach is asymmetric in that a terminal connects when it has data to transmit, but it is the module that decides on the time of disconnection. This makes optimum management of the connectivity of a terminal difficult.

In order to respond to the limitations of this first solution, the invention proposes an alternative approach, where the management of the connection/disconnection is managed closer to the requirements, from the terminal.

Thus one subject matter of the present invention is a method, also referred to as a software application, executable by at least one processor included in a terminal of the type that can be connected to a cellular communication network, the method being configured to manage the connectivity of said terminal. More precisely, the method than can be executed on the terminal is configured to enable and interrupt the connection of the terminal to the network.

More particularly, one subject matter of the present invention concerns a method for managing the connectivity of a terminal that can be connected to a cellular communication network, the method comprising the following steps performed in the terminal:

determining whether configuration conditions required for enabling a connection of the terminal to the network are met, enabling connection of the terminal to the network and enabling the sending of the messages only if the configuration conditions required are met, otherwise preventing connection of the terminal to the network.

Such a software application is advantageous in that, once downloaded, it is able to manage the connectivity of the terminal locally from the latter. It is thus best placed to observe and determine the requirements with regard to both connection and disconnection of said terminal.

Optionally but nevertheless highly advantageously, the method comprises a step performed in the terminal and consisting of receiving, from a management module distant from the terminal, a signalling message controlling disconnection of the terminal. In response to this signalling message controlling disconnection of the terminal, the terminal is disconnected from the network.

Optionally but nevertheless highly advantageously, the method also performs the following steps if the terminal is already connected to the network before the determination and enabling steps:

the determination step is performed at the end of the sending of messages or at the end of a predetermined period following the sending of messages, or a predetermined connection period, the enabling step causes: the maintenance of the connection of the terminal to the network if the configuration conditions required to establish a connection of the terminal to the network are met or the interruption of the connection of the terminal to the network if the configuration conditions required for establishing a connection of the terminal to the network are not met.

Thus, when it is already connected to the network, the terminal, autonomously and automatically, disconnects from the network when the predefined disconnection conditions are satisfied.

Optionally but nevertheless highly advantageously, the method also performs the following steps if the terminal is not already connected to the network:

the determination step is preceded by a step of detecting messages intended to be sent from the terminal through the network, the enabling step causes: the establishment of the connection of the terminal to the network only if the configuration conditions required for establishing a connection of the terminal to the network are met.

Thus, when it is not yet connected to the network, the terminal, autonomously and automatically, connects thereto when the predefined disconnection conditions are satisfied.

Optionally, the method according to the invention also comprises at least any one of the optional steps and features indicated below:

the step consisting of determining whether configuration conditions required for establishing a connection of the terminal to the network are met comprises a step of comparing at least one profile condition with at least one context data item available at the terminal and which characterises the context of connection of the terminal to the network;

the step consisting of determining whether configuration conditions required for establishing a connection of the terminal to the network are met comprises the recovery of at least one condition stored in a profile stored in the terminal;

each condition is associated with a parameter, the parameter being taken from: a time range defining at least one time range where the terminal is enabled to connect to the network, a time range defining at least one time range where the terminal is not enabled to connect to the network, days defining at least one day in the week where the terminal is enabled to connect to the network, days defining at least one day in the week where the terminal is not enabled to connect to the network, a number of tests defining a number of attempts enabled when an attempt at connection fails;

each condition is associated with a parameter and the parameter concerns a maximum period of connection of the terminal to the network or a maximum period of connection of the terminal to the network after the sending of the previous message;

at least one of the parameters concerns a maximum quantity of data that can be transmitted during the same connection or a maximum number of messages that can be transmitted during the same connection;

the method comprises the following steps prior to the determination and enabling steps performed in a terminal: receiving at the terminal a downloading message comprising a software application (SIMA) executable on the terminal and configured to perform at least the enabling step so as to manage the connection of the terminal to the network;

the downloading message comprising the software application (SIMA) is sent by a management module of the connectivity of the terminal disposed in a cellular communication network and distant from the terminal;

the method comprises the following steps performed in the terminal: receiving, from a management module distant from the terminal, a message inhibiting the determination and enabling steps performed in the terminal.

The software application comprises an applet hosted on a microcircuit card associated with said terminal.

The software application also comprises an interception means able to intercept messages intended to be sent from the terminal, in order to determine whether or not a connection is necessary.

The software application also comprises a connection means able to make a connection of the terminal to the cellular communication network if at least one data item is to be transmitted and configuration conditions are met.

The software application also comprises a disconnection means able to effect a disconnection of the terminal from the cellular communication network if no data item is to be transmitted and/or if configuration conditions are not met.

Optionally, the method according to the invention also comprises at least any one of the optional steps and features indicated below.

The method comprises the following steps performed by a management module of the connectivity of the terminal in a cellular communication network, the management module being distant from the terminal: sending, to a connection module responsible for the radio connection of the terminal to the cellular communication network, a signalling message controlling disconnection of the terminal.

The enabling step performed in the terminal is effected by a software application (SIMA) that is executed in the terminal. Prior to the sending by the management module of a signalling message controlling disconnection of the terminal, the management module sends to the terminal a signal deactivating the software application (SIMA).

The management module identifies whether a software application (SIMA) that is executed in the terminal and that performs at least the enabling step is active on the terminal. The management module does not send a signalling message controlling disconnection of the terminal if the software application (SIMA) is active on the terminal.

The management module determines whether the sending of the signalling message controlling disconnection of the terminal actually causes a disconnection of the terminal. If the sending of the signalling message controlling disconnection of the terminal does not cause a disconnection of the terminal, then the management module sends a message activating a software application (SIMA) that is executed in the terminal and performs at least the enabling step. In response to the activation message, the software application (SIMA) is activated and performs at least the enabling step so as to manage the connection of the terminal to the network. Thus the invention makes it possible to force the disconnection of the terminal if the latter is not functioning correctly.

According to another aspect, the present invention provides a management module of the connectivity of a terminal of the type that can be connected to a cellular communication network, in a cellular communication network. The management module comprises such a software application and a downloading means able to download said software application to said terminal.

The management module is distant and distinct from the terminal.

The management module also comprises a database, indexed by the subscription identifier, storing said software application.

Said downloading means is able to download said software application in the microcircuit card of said terminal when the terminal is first connected to the cellular communication network.

Said downloading means also comprises a sending means configured to send a message using the short message service (SMS message) protocol or the unstructured supplementary service data protocol (USSD message) or the data sending protocol normally referred to as GPRS (the acronym for General Packet Radio Service), in order to download said software application (SIMA) by means of an SMS message or a data packet sent to said terminal by the cellular communication network.

The management module also comprises a sending means able to send, to a connection module responsible for the radio connection of a terminal to the cellular communication network, a signalling message controlling disconnection of a terminal.

Said sending means is designed so as not to send a signalling message controlling disconnection of a terminal if a software application is active on said terminal.

The management module is included in an MLR module responsible for managing the machine terminals. The MLR module comprises, in addition to the management module, a location register module (HLR) and an equipment identity register module (EIR).

According to another aspect, the invention also comprises a computer program product (SIMA), also referred to as a software application (SIMA), comprising instructions which, when they are executed by at least one processor, perform the steps of a method according to any one of the above features.

In a preferred but non-limitative manner, the computer program product (SIMA) is saved in a memory of the terminal or on a microcircuit card configured so as to be inserted in the terminal.

Another aspect of the invention concerns a microcircuit card comprising a memory in which a computer program (SIMA), also referred to as a software application (SIMA), is stored, in accordance with any one of the above features.

According to another aspect, the invention also comprises a terminal comprising information transmission means as well as a computer program (SIMA), also referred to as a software application (SIMA), according to any one of the above features.

According to another aspect, the invention also comprises a management module of the connectivity of at least one terminal of the type that can be connected to a cellular communication network, in a cellular communication network, characterised in that it comprises a computer program product (SIMA), also referred to as a software application (SIMA), comprising instructions which, when they are executed by at least one processor, perform at least any one of the steps performed in the terminal and mentioned above, and a downloading means configured so as to download said computer program product (SIMA) to said terminal.

Optionally, the management module of the connectivity of the terminal according to the invention also comprises at least any one of the optional features indicated below:

the management module also comprises a database saved in data storage means, indexed by the subscription identifier (IMSI), the database storing said computer program product (SIMA);

the downloading means is configured to download said computer program product (SIMA) in the microcircuit card of said terminal when the terminal is first connected to the cellular communication network;

the downloading means also comprises a sending means configured to send a message using the short message service protocol (SMS message) or the unstructured supplementary service data protocol (USSD message), in order to download said computer program product (SIMA) by means of an SMS message or a USSD message sent to said terminal via the cellular communication network;

the management module comprises a sending means configured to send, to a connection module responsible for the radio connection of a terminal to the cellular communication network, a signalling message controlling disconnection of a terminal;

said sending means is designed so as to not to send a signalling message controlling a disconnection of a terminal if said computer program product (SIMA) is active on said terminal;

the terminal is a machine terminal, and where the management module is included in a module (MLR) that comprises, in addition to the management module, a location register module (HLR) and an equipment identity register module (EIR).

According to another aspect, the invention also comprises a management module of the connectivity of at least one terminal of the type that can be connected to a cellular communication network, within a cellular communication network, the management module comprising a sending means configured to send, to a connection module responsible for the radio connection of a terminal to the communication network, a signalling message controlling disconnection of a terminal.

According to another aspect, the invention concerns a method for managing the connectivity of a terminal connectable to a cellular communication network, the method comprising the following steps:

providing a management module of the connectivity of at least one terminal of the type that can be connected to a cellular communication network, the management module being situated in a cellular communication network, sending, from the management module and to a connection module responsible for the radio connection of a terminal to the cellular communication network, a signalling message controlling disconnection of a terminal.

According to another aspect, the invention also comprises a communication system comprising a cellular communication network, at least one terminal according to the present invention and at least one management module according to the invention.

Figure 2:
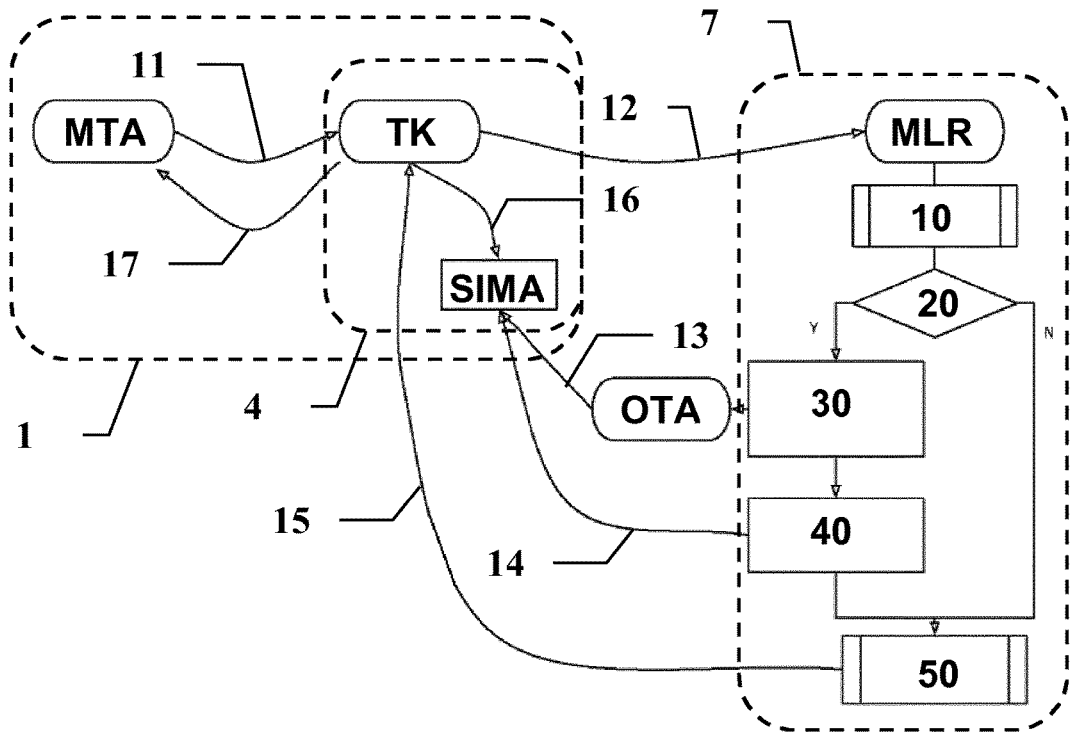
Figure 3:
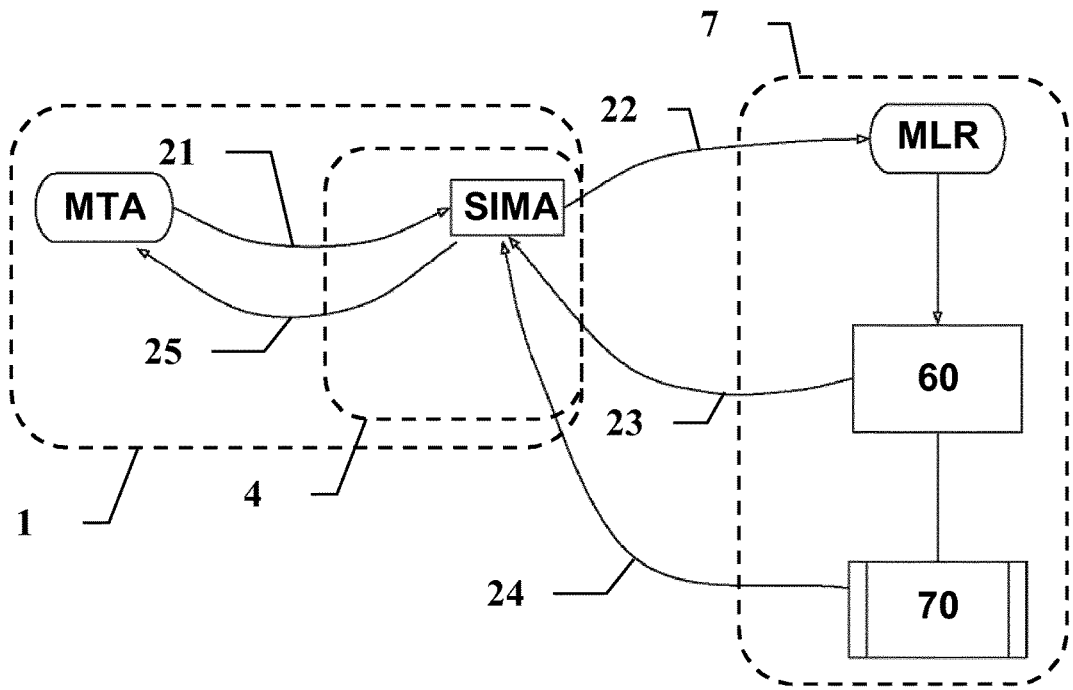

Other features, details and advantages of the invention will emerge more clearly from the detailed description given below by way of indication in relation to the drawings, on which:

FIG. 1 presents an organic diagram showing an environment able to accept the invention, FIG. 2 presents a functional diagram of an embodiment of the invention, at the time of a first connection, FIG. 3 presents a functional diagram of an embodiment of invention at the time of a subsequent connection.

According to FIG. 1, a terminal 1 is connected via a cell 2 to a cellular communication network 3. The cells 2, 2' are distributed geographically in order to offer a coverage area. The terminal 1 may be either a telephone terminal or a machine terminal. The connection 5 between the terminal 1 and the cell 2 is typically a wireless connection 5, such as a radio-frequency connection. In order to be able to connect to a cellular communication network 3, a terminal 1 must have a subscription contracted with a supplier. This subscription is represented by a microcircuit card, also often referred to as a chip card, or designated by the acronym USIM (Universal Subscriber Identification Module) or SIM card 4, which is associated with the terminal. For reasons of clarity and concision, in the remainder of the description the microcircuit card will be referred to as a SIM card. The SIM card is typically embedded in the terminal. It may be inserted therein at the time of manufacture of the terminal and be non-removable or be removable.

The present invention is not limitative of a type of terminal. A terminal may be any equipment able to be connected to a wireless communication network in order to send and preferably receive messages. Thus, in the context of the present invention, a terminal may be a sensor provided with a transmitter. Such a sensor may for example capture a temperature, a current, a pressure, a light signal, a digital or analogue value, etc.

The connection 6 between a cell 2 and the rest of the communication network 3 is, usually, a cabled connection 6. The rest of the communication network 3 comprises, in a conventional manner, interconnected nodes, comprising software modules 7 responsible for the various functions necessary for the management and functioning of the cellular communication network 3. Said cellular communication network 3 advantageously comprises gateways to other communication networks, such as the internet.

In a known manner, the SIM card 4 or microcircuit card comprises a chip or microcontroller able to execute software applications, as well as the memory. Said memory is able to store information and/or software applications. The information may include the parameters and identifiers attesting to the taking out of a subscription, and authenticating the subscription in order to make a connection to the cellular communication network 3.

Among the software applications that may be stored on the SIM card 4, an operating system may be cited. A virtual machine, such as a Java interpreter, which makes it possible to execute software applications developed in Java language, may also be cited. A particular application is also a SIM application tool kit TK that advantageously makes it possible to download a software application, in the form of an applet, stored in the memory of the SIM card 4 and configured to be executed on the microcontroller of the SIM card 4. An applet is a software application configured so as thus to be stored on a SIM card 4 in order then to be executed in the environment of said SIM card 4. Said tool kit TK also makes it possible to download such an applet, for example by means of an SMS received by the terminal 1, and to manage execution thereof.

In order to manage the connection/disconnection of a terminal 1 with a cellular communication network 3, according to an important feature of the invention, a software application SIMA executable by a terminal 1 is responsible for the management of the connectivity of said terminal 1. This software application SIMA manages the connection and disconnection of the terminal 1. The objective of this management of connectivity is typically to make a connection only when necessary and when the terminal 1 has at least one data item to send to another device via the cellular communication network 3 and to make a disconnection as soon as possible after sending when a connection is no longer necessary for a long time. Management of connectivity assumes here that the software application SIMA itself makes the connection or respectively disconnection, or that it enables another element to make this connection or respectively disconnection.

According to an advantageous feature, the software application comprises an SIMA applet. Such an SIMA applet is advantageously hosted in the memory of a USIM microcircuit card 4 associated with said terminal 1 and executable by the microcontroller of said USIM card 4.

In order to be able to effectively fulfil its function of manager of connectivity of the terminal 1, the SIMA software application must be in a position to know whether a connection of the terminal 1 to the network 3 is necessary. For this purpose it is necessary for the SIMA software application to be informed when the terminal 1 wishes to send at least one data item.

In order to send at least one data item to another device via the cellular communication network 3, a terminal 1 uses a communication means offered by the cellular communication network 3 and which is generically termed a message. A message is here initiated by the terminal 1. A message sent from the terminal 1, or "Mobile Originated" or MO, is then spoken of.

Thus, in order to be informed of a need to send, the SIMA software application comprises means (also referred to as a message interceptor) for intercepting messages intended to be sent from the terminal 1. Thus the SIMA software application is informed that a message must be sent and may consequently determine whether or not a connection is necessary.

The names of the various elements, messages, tools employed, may differ from one cellular communication network standard to another. The following paragraph illustrates a GSM cellular communication network. However, a person skilled in the art will know how to adapt equivalent elements, messages and tools in another cellular communication network standard and the invention is in no way limitative of a GSM network.

In a cellular communication network, a terminal 1 sends at least one data item by means of a message using a standard protocol of the network in question. In a GSM network, such a message may thus be a message using the "short message service" normally designated by its English acronym SMS. Such a message may also be a message using the "Unstructured Supplementary Service Data" protocol, normally referred by its English acronym USSD.

Although in the remainder of the description this type of message will be referred to as an SMS message for reasons of clarity and concision, the invention extends to all variants using different messages and in particular to variants in which an SMS message is substituted for USSD message or equivalent.

Still in the GSM standard, a means for intercepting SMS messages intended to be sent from the terminal MO can advantageously be implemented by activation of a service for controlling and intercepting system short messages. This service is called "MO short message controlled service". The effect of establishing this service is that any system short message that attempts to send the terminal 1 is previously redirected to the SIM card 4 and thus more particularly to the SIMA software application.

Thus the SIMA software application is informed of any message starting from the terminal 1, and may actually decide to make a connection, to delay such an implementation, to making a disconnection or to delay such an implementation, depending on the presence or not of data to be sent and, where applicable, configuration parameters able to specify the connectivity management strategy.

The configuration parameters are typically included in a profile associated with the terminal 1. These configuration parameters may comprise, for example, and non-exhaustively, the following parameters.

A parameter may be a "connection control" parameter. This parameter is a logic parameter with two values. It determines whether the terminal 1 must receive an SIMA software application managing its connectivity, or whether, on the contrary, the terminal 1 must remain connected continuously.

Another parameter is an "hours" parameter. This parameter comprises at least one hourly range, and defines at least one hourly range where the terminal 1 is enabled to connect to the network. In an alternative or complementary manner, a parameter may also define at least one hourly range where the terminal 1 is not enabled to connect to the network.

Another parameter is a "days" parameter. This parameter comprises at least one day of the week and defines at least one day of the week where the terminal 1 is enabled to connect to the network. In an alternative or complementary manner, a parameter may also define at least one day of the week where the terminal 1 is not enabled to connect to the network.

Another parameter is a "number of tries" parameter. This parameter defines a number of attempts authorised when there is a failure of an attempt to connect.

Another parameter is a "maximum duration" parameter. This parameter defines a maximum duration during which the terminal 1 may remain connected continuously. In an alternative or complementary manner, this parameter defines a maximum duration which the terminal 1 may remain connected continuously after the sending of the last message sent.

Another parameter is a "quota" parameter. This parameter defines a maximum quantity of data that can be transmitted during a connection. In an alternative or complementary manner, this parameter defines a maximum number of messages that can be transmitted during the same connection.

Other configuration parameters may also be added to the profile.

In order to enable the establishment, and respectively the maintenance, of the connection of the terminal 1 to the network 3 or on the other hand to prevent the establishment of or respectively to interrupt the connection, the SIMA software application checks whether the required conditions are met. For this purpose, the application recovers conditions or rules associated with the terminal 1. Preferably, these conditions or rules are predefined in a profile associated with the terminal 1. Each condition is associated with a parameter such as those mentioned previously. Thus the ASIM software application may recover a set of rules or conditions. For example, it recovers the following rules:

"connection possible if: the time is between 8 pm and 6 am, the day is Saturday or Sunday, the connection time is less than 60 seconds".

The software application next recovers data defining the context of the attempt to connect or maintain the connection. The context data relate to the required configuration conditions and make it possible, by comparison, to determine whether or not these conditions are satisfied. For example,
  if the parameter is a time range, then the data item is preferably the current time. This time is preferably recovered by the SIMA software application from a clock of the terminal 1;
  if the parameter is a day or a set of days of the week, then the data item is preferably the current day. This day is preferably recovered by the SIMA software application from a clock of the terminal 1 that indicates the day;
  if the parameter is a number of tries, then the data item is preferably the number of tries already made. This context data is preferably recovered by a try counter;
  if the parameter is a maximum duration of connection, then the data item is preferably a duration from the start of the connection. This context data item is for example provided by a time counter triggered at the start of each connection.

Preferably, if at least one of the configuration conditions is not satisfied, then the connection is not enabled. In the example cited previously, if the time is 9.30 pm, the day is Saturday and the connection term is 45 seconds, then the software application maintains the connection of the terminal 1 to the network 3. A few seconds later, when the time counter exceeds 60 seconds, then the software application interrupts the connection of the terminal 1 to the network 3.

It has been described how an SIMA software application embedded on a terminal 1 can manage the connectivity of said terminal 1 locally from the terminal 1.

According to another feature, the invention comprises, within the cellular communication network 3, also a management module 7 responsible for managing the connectivity of the terminal 1. According to an advantageous feature, this management module 7 comprises an SIMA software application, as described previously, associated with said terminal 1 and a downloading means configured to download said SIMA software application to said terminal 1.

Thus, for example, the management module 7 comprises a database, storing such an SIMA software application, for at least one terminal 1, or a type of terminal, that can connect to the cellular communication network 3. Such a database may advantageously be indexed by subscription identifier or type of subscription. In a known manner, a subscription is identified uniquely by an international mobile subscriber identifier or IMSI. Said IMSI identifier is communicated to the network 3 by a terminal 1 when an attempt is made to connect. This enables the management module 7 to identify the appropriate SIMA software application suited to the terminal 1.

The downloading means of the management module 7 is configured to download said SIMA software application into a USIM card of said terminal 1. This is advantageously done when the terminal 1 is first connected to the cellular communication network 3. The management module 7 keeps, for example in the database, a boolean indicator indicating whether or not a terminal 1 has already connected to the cellular communication network 3. Two different procedures, which will be detailed below, can thus be followed depending whether or not it is a first connection.

The downloading of the SIMA software application is advantageously done wirelessly, by radio-frequency transmission. Such transmission is called "over the air" or OTA. According to an advantageous embodiment, in that it uses widespread existing services, the management module 7 sends at least one SMS message containing the SIMA software application, to the terminal 1. Thus the downloading means comprises a means for sending an SMS message for this purpose. It can thus download said SIMA software application via the cellular communication network 3.

This embodiment, which is called a "software application", based on an SIMA software application embedded in the terminal 1 and previously downloaded from a management module 7 belonging to the cellular communication network 3, when said terminal 1 is first connected, will now be described in more detail according to a particular embodiment, with reference to FIGS. 2 and 3.

FIG. 2 illustrates the performance of the operations when the terminal 1 is first connected to the cellular communication network 3. FIG. 3 illustrates the performance of the operations during a subsequent connection.

FIG. 2 illustrates firstly a terminal 1 comprising a USIM card 4, and secondly a management module 7 belonging to the cellular communication network 3. The terminal 1 executes an MTA (Mobile Terminal Application) software application, which manages the sending of data to the network 3. This MTA application wishes to connect in order to send at least one data item to the network 3. To this end it sends a connection request 11 ("attach request"). The USIM card 4 executes another appropriate software application, which comprises at least one toolkit TK. This application, because of the establishment of the message controller and interception service, intercepts this connection request 11. This connection request is however retransmitted in the form of a similar connection request 12 addressed to the network 3. This connection request 12 is processed by the management module 7, here an MLR module. Said processing comprises a first stage 10, during which the module 7 consults a database in order to obtain a configuration profile associated with the terminal 1. More exactly, the configuration profile is associated with a subscription associated with the terminal 1 and said configuration profile is indexed in the database by means of its IMSI identifier.

During a following step 20, the management module 7 checks, according to the "connection control" parameter contained in the profile, whether it is necessary to manage the connectivity of the terminal 1 by means of an SIMA software application. If the result is negative, step 50 is directly proceeded to. This case may, for example, correspond to a terminal 1 the connectivity of which must be managed according to a "signalling" embodiment. This connectivity management mode will be detailed below.

If the result is positive, the connectivity of the terminal 1 must be managed by means of an SIMA software application. During a step 30, an SIMA applet, recovered from the database, is downloaded 13 via an OTA downloading module, intended for the USIM card 4 of the terminal 1. This is advantageously performed by means of a short message system SMS.

During an optional following step 40, the management module 7 transmits 14 to said SIMA applet a configuration profile containing the parameters defining when and how a connection/disconnection must be done ("hours", "days", etc). This is advantageously done by means of a short message system SMS.

During a following step 50, performed whether or not the terminal 1 has its connectivity managed via an SIMA applet, the conventional authentication operations are proceeded with in order to enable the terminal 1 to connected or not. This step 50 is known. It aims to check security conditions but, unlike the SIMA applet executed at the terminal, it does not aim to manage the connection according to the verification of profile parameters. During this step 50, the management module 7 sends 15 the elements to be checked to the TK application executed on the USIM card 4.

According to the authentication result, the TK application activates 16 the control and interception service in favour of the SIMA applet, so that any message attempting to leave the terminal 1 is redirected to said SIMA applet.

Next the TK application sends 17, to the MTA terminal application, a validation/invalidation of the connection request, by means of a connection acceptance message ("attach accept") or refusal of connection ("attach refuse").

During its first connection to the cellular communication network 3, the terminal 1 is thus identified as such and, where applicable, is allocated and has downloaded an SIMA applet responsible for managing its connectivity.

With reference now to FIG. 3, a description will now be given of a subsequent connection. The process is here initiated by the MTA application executed on the terminal 1 which, because it has at least one data item that it wishes to transmit to the cellular communication network 3, sends a first message 21. This message is a request to send an SMS message. Because of the establishment of the control and interception service, this message 2 is intercepted by the SIMA applet, installed at the time of the first connection.

This SIMA applet, if the configuration parameters contained in its profile are satisfied, enables a connection and sends a connection request message ("attach request") 22 to the management module 7.

This management module 7 then performs two steps. During a step 60, it checks whether an update of the SIMA applet or of its configuration profile is necessary. Such an update possibility makes it possible to pass on a new configuration policy by transmitting it to the SIMA applets responsible for managing connectivity. It makes it possible to change the configuration profile, or the SIMA applet itself. If such an update is required, it is then performed by a message 23 sent to the SIMA applet. If no updating is necessary, the message 23 is not sent.

During a step 70, similar to step 50 in FIG. 2, the authentication checks on the terminal 1 are carried out. According to the result of this authentication, a connection authorisation ("attach accepted") message 24 or refusal of connection ("attach refused") message 24 is sent to the SIMA applet.

The SIMA applet retransmits this connection acceptance or refusal message to the MTA application via a message 25.

According to an alternative embodiment, which is called "signalling", it is possible to manage the connectivity of a terminal 1 connectable to the cellular communication network 3 from the cellular communication network 3 itself. In this case a module is responsible for disconnecting a terminal 1 when the latter is connected to the network but typically is inactive. To do this, said module sends a signalling message controlling disconnection, to the module or modules in the network responsible for managing the connection with the terminal. Thus, for example in a GSM network, the module responsible for managing the radio link with a terminal 1, the base station controller module (BSC), receives such a command and then disconnects the terminal 1.

In some cases, it may be advantageous for the remote management module of the terminal, typically an HLR or the MLR, to order disconnection. This detachment is typically dependent on the rights defined in the profile of the terminal. This makes it possible to optimise the network load since the terminals are connected/disconnected as soon as possible according to the data of the operator, which may prove to be more effective than a solution in which the terminal is managed by elements external to the network of the operator, such as the terminal itself or an application embedded in it. This alternative enables the operator to control the deactivation.

Furthermore, this solution does not require for all the applications and terminals to implement a solution based on a disconnection managed by the terminal, thus reducing costs.

This embodiment is particularly, in cooperation with the "software application" embodiment.

According to the "signalling" embodiment, a "signalling" management module, which may or not be merged with the management module 7 previously described with reference to the "software application" embodiment, comprise a means for sending a signalling message in order to demand disconnection of a terminal 1. Such a signalling message is thus sent to a connection module, such as the BSC module, responsible for the radio connection of a terminal 1 to the cellular communication network 3. In a network to the GSM standard, such a signalling message may, for example, be an "MAP-cancel-location" message, the type of termination of which ("cancellation-type") will be positioned at "subscription withdrawn".

According to an advantageous embodiment that combines the previous two "software application" and "signalling" embodiments, the management module 7 arbitrates between these two possible modes. The choice of a connection/disconnection management embodiment is advantageously made by the management module 7 for example according to a configuration parameter determined for each terminal, for example by a configuration profile included in the database, advantageously indexed in said database by means of the IMSI identifier of said terminal 1.

It is also possible, for the management module 7, to pass from one embodiment to the other.

Thus, for example, if the connectivity of a terminal 1 is initially managed according to a "signalling" mode and the management module 7 realises, for example by means of a counting of the number of connections in a period of time, that the sending of a signalling message does not suffice to disconnect the terminal 1, the management module may decide, advantageously if the configuration of the terminal 1 so enables, to change embodiment and pass to "software application" mode. For this purpose, the management module 7 then downloads an SIMA software application that then takes over and manages the connectivity of the terminal 1 from the terminal 1 itself.

In this case the management module 7, after the downloading of the SIMA software application, advantageously is careful not to send signalling messages demanding disconnection of the terminal 1 any longer.

On the other hand, if the connectivity of a terminal 1 is initially managed according to a "software application" mode, the management module 7 may decide to stop the functioning of said SIMA software application. For this purpose, the management module 7 ensures that the SIMA software application is no longer operational. For this purpose the management module 7 causes an "unloading" of said SIMA software application or transmits to the terminal 1 a command inhibiting the SIMA software application. At the very least, it is always possible for the management module 7 to update/download a new SIMA software application, empty or inoperative, which replaces the old one. After having made said SIMA software application inoperative, the management module 7 goes to "signalling" mode again and directly controls a disconnection of the terminal 1 by sending a disconnection signalling message.

Thus, in all cases, the management module 7 remains master of the method for managing the connectivity of a terminal 1.

At a given moment, however, the two "software application" and "signalling" embodiments are advantageously exclusive. Thus the management module refrains from sending a disconnection signalling message to a terminal 1 the connectivity of which is managed by an SIMA software application downloaded and functionally active. If an SIMA software application is downloaded and active on the terminal 1, this SIMA software application is responsible for managing the connectivity of the terminal 1. Thus the management module 7 advantageously makes an SIMA software application inactive or non-existent on a terminal 1 before sending any disconnection signalling message.

Thus, and as indicated previously, the step of disconnecting the terminal with respect to the network may be done in several ways. In particular, the disconnection of the terminal may comprise:

the reception by the terminal 1 of a signalling message controlling disconnection of the terminal 1 and sent by the management module 7 distant from the terminal 1, the disconnection then being effected by the terminal 1; or the sending of a signalling message controlling disconnection of the terminal 1, the messages being sent by the management module 7 to a connection module responsible for the connection of the terminal 1 to the network 3, disconnection then being effected by said connection module.

The invention thus guarantees disconnection of the terminal even if the latter is not functioning correctly. This frequently happens when the terminal, typically a sensor, has been obtained at low cost.

In an intermachine environment, comprising at least one machine terminal 1, it is advantageous to manage said at least one machine terminal by means of a particular MLR module. A precise description of such an MLR module is, for example, given in the European patent application No 11306123.8 filed on 9 Sep. 2011 by the same applicant.

Such an MLR module is substituted, with regard to the machine terminals 1 and their management, for certain cellular communication network modules 3. Among these modules are the location register module HLR and the equipment identity register module EIR. The module MLR is thus substituted for these modules EIR, HLR, which it replaces for managing the machine terminals. Thus, for the machine terminals, any communication intended for a module HLR, EIR is redirected to the module MLR that replaces it. The module MLR fulfils, for the machine terminals, the same functions as these modules and consequently responds to the requests of the requesters. This advantageously makes it possible to centralise all the processing operations relating to the machine terminals within the same MLR module.

Thus, in such an environment comprising an MLR module, this MLR module advantageously also comprises the management module 7 of the connectivity previously described, both for the "software application" embodiment and for the "signalling" embodiment.

Although a preferred embodiment of the invention is described herein, it must be understood that the invention is not limited to this embodiment and that variations may be made within the scope of the following claims.

The invention claimed is:

1. A method for managing the connectivity of a terminal connectable to a cellular communication network, the method comprising the following steps performed in the terminal:
   determining whether configuration conditions required for enabling connection of the terminal to the network are met,
   enabling connection of the terminal to the network only if the required configuration conditions are met; preventing connection of the terminal to the network if the required configuration conditions are not met,
   disconnecting the terminal with respect to the cellular communication network in response to:
      the sending of a signalling message demanding disconnection of the terminal, the signalling message being sent by a non-transitory management module within the cellular network for managing the connectivity of the terminal, the non-transitory management module being distinct from the terminal, the signalling message being sent to a non-transitory connection module responsible for the radio connection of the terminal to the cellular communication network, the disconnection of the terminal from the cellular communication network being done by said non-transitory connection module,
   wherein the non-transitory management module comprises a database saved in data storage means and indexed by a subscription identifier (IMSI) of the terminals,
   wherein the database stores a configuration profile for the terminal, and
   wherein the sending by the non-transitory management module of a signalling message demanding disconnection of the terminal depends on said configuration profile.

2. The method according to claim 1, wherein said non-transitory connection module responsible for the radio connection of the terminal to the cellular communication network and that disconnects the terminal from the cellular communication network upon reception of the signalling message demanding disconnection of the terminal is a base station controller (BSC) module.

3. The method according to claim 1, in which the non-transitory management module determines whether the sending of the signalling message controlling disconnection of the terminal actually causes a disconnection of the terminal; and, if the sending of the signalling message controlling disconnection of the terminal does not cause a disconnection of the terminal, then the non-transitory management module sends an activation message of a non-transitory software application (SIMA) that is executed in the terminal and performs at least the enabling step; in response to the activation message, the non-transitory software application (SIMA) is activated and performs at least the enabling step so as to manage the connection of the terminal to the network.

4. The method according to claim 2, in which the enabling step performed in the terminal is effected by a non-transitory software application (SIMA) that is executed in the terminal and in which, prior to the sending by the non-transitory management module of a signalling message controlling disconnection of the terminal, the management module sends to the terminal a deactivation signal of the non-transitory software application (SIMA).

5. The method according to claim 2, in which the non-transitory management module identifies whether a non-transitory software application (SIMA) that is executed in the terminal and which performs at least the enabling step is active on the terminal, and does not send a signalling message controlling disconnection of the terminal if the non-transitory software application (SIMA) is active on the terminal.

6. The method according to claim 1, in which, if the terminal is already connected to the network before the determination and enabling steps:
   the determination step is performed at the end of the sending of messages or at the end of a predetermined period following the sending of messages, or at the end of a predetermined connection period,
   the enabling step causes: the maintenance of the connection of the terminal to the network if the configuration conditions required for establishing a connection of the terminal to the network are met or the disconnection of the terminal to the network if the configuration conditions required for establishing a connection of the terminal to the network are not met.

7. The method according to claim 6, in which, if the terminal is not already connected to the network:
   the determination step is preceded by a step of detecting messages intended to be sent from the terminal through the network,
   the authorisation step causes: the establishment of the connection of the terminal to the network only if the configuration conditions required for establishing a connection of the terminal to the network are met.

8. The method according to claim 1, in which the step consisting of determining whether configuration conditions required for establishing a connection of the terminal to the network are met comprises a step of comparing at least one profile condition with at least one context data item available at the terminal and which characterises the context of connection of the terminal to the network.

9. The method according to claim 8, in which the step consisting of determining whether configuration conditions required for establishing a connection of the terminal to the network are met comprises the recovery of at least one condition stored in a profile stored in the terminal.

10. The method according to claim 8, in which each condition is associated with a parameter, the parameter being taken from: an hourly range defining at least one hourly range where the terminal is enabled to connect to the network, an hourly range defining at least one hourly range where the terminal is not enabled to connect to the network, days defining at least one day of the week where the terminal is enabled to connect to the network, days defining at least one day of the week where the terminal is not enabled to connect to the network, a number of tries defining a number of attempts enabled when an attempt at connection fails.

11. The method according to claim 8, in which each condition is associated with a parameter and the parameter concerns a maximum time of connection of the terminal to the network or a maximum time of connection of the terminal to the network after the sending of the previous message.

12. The method according to claim 8, in which at least one of the parameters concerns a maximum quantity of data that can be transmitted during the same connection or a maximum number of messages that can be transmitted during the same connection.

13. The method according to claim 1, comprising the following steps prior to the determination and enabling steps performed in the terminal: receiving at the terminal a downloading message comprising a non-transitory software application (SIMA) executable on the terminal and configured to perform at least the enabling step so as to manage the connection of the terminal to the network.

14. The method according to claim 13, in which the downloading message comprising the non-transitory software application (SIMA) is sent by a non-transitory management module of the connectivity of the terminal, the non-transitory management module disposed in a cellular communication network and being distinct from the terminal.

15. The method according to claim 1, comprising the following steps performed in the terminal: receiving, from a non-transitory management module distinct from the terminal, a message inhibiting the determination and enabling steps performed in the terminal.

16. The method according to claim 1, wherein the steps of the method are implemented by instructions stored in a non-transitory computer program product which, when executed by at least one processor, perform the steps of the method.

17. The method of claim 16, wherein the non-transitory computer program (SIMA) is saved in a memory of the terminal or on a microcircuit card configured so as to be inserted in the terminal.

18. The method according to claim 16, wherein the non-transitory computer program (SIMA) is stored on a microcircuit card comprising a memory.

19. The method according to claim 16, wherein at least one terminal comprises means for transmitting information and the non-transitory computer program (SIMA).

20. The method according to claim 1, wherein the non-transitory management module within the cellular communication network manages the connectivity of at least one terminal of the type that can be connected to the cellular communication network; and
    wherein the non-transitory management module comprises a non-transitory computer program product comprising instructions which, when they are executed by at least one processor, perform the steps of the method; and
    a downloading means configured to download said non-transitory computer program product to said at least one terminal.

21. The method according to claim 20, implemented by the non-transitory management module also comprising a database saved in data storage means, indexed by the subscription identifier (IMSI), the database storing said non-transitory computer program product.

22. The method according to claim 20, implemented by the non-transitory management module, and wherein the downloading means is configured to download said non-transitory computer program product in the microcircuit card of said terminal when the terminal is first connected to the cellular communication network.

23. The method according to claim 20, implemented by the non-transitory management module, and wherein the downloading means also comprises a sending means configured to send a message using the short message service protocol (SMS message) or the unstructured supplementary service data protocol (USSD message) or the general packet radio-communication service protocol (GPRS), in order to download said non-transitory computer program product by means of an SMS message or a USSD message sent to said terminal via the cellular communication network.

24. The method according to claim 20, implemented by the non-transitory management module also comprising a sending means configured to send, to a non-transitory connection module responsible for the radio connection of a terminal to the cellular communication network, a signalling message controlling disconnection of a terminal.

25. The method according to claim 24, implemented by the non-transitory management module, and wherein said sending means is designed so as not to send the signalling message controlling disconnection of the terminal if said non-transitory computer program product is active on said terminal.

26. The method according to claim 20, implemented by the non-transitory management module, wherein the terminal is a machine terminal, and wherein the non-transitory management module is included in a module (MLR) that comprises, in addition to the non-transitory management module, a location register module (HLR) and an equipment identity register module (EIR).

27. A communication system comprising a cellular communication network, at least one terminal comprising means for transmitting information and at least one non-transitory management module within the cellular communication network for managing the connectivity of at least one terminal of the type that can be connected to a cellular communication network, wherein the non-transitory management module comprises a non-transitory computer program product comprising instructions which, when they are executed by at least one processor, perform the steps of a method, and a downloading means configured to download said non-transitory computer program product to said terminal, wherein the method comprises the steps of:
    determining whether configuration conditions required for enabling connection of the terminal to the network are met,
    enabling connection of the terminal to the network only if the required configuration conditions are met; preventing connection of the terminal to the network if the required configuration conditions are not met,
    disconnecting the terminal with respect to the cellular communication network in response to:
        the sending of a signalling message demanding disconnection of the terminal, the signalling message being sent by the non-transitory management module within the cellular communication network for managing the connectivity of the terminal, the non-transitory management module being distinct from the at least one terminal, the signalling message being sent to a non-transitory connection module responsible for connecting the terminal to the cellular communication network, the disconnection being done by said non-transitory connection module;

wherein the non-transitory management module comprises a database saved in data storage means and indexed by a subscription identifier (IMSI) of the terminals, wherein the database stores a configuration profile for the terminal, and wherein the sending by the non-transitory management module of a signalling message demanding disconnection of the terminal depends on said configuration profile.

28. The method according to claim 6, wherein a non-transitory computer program product comprises instructions which, when said instructions are executed by at least one processor, the steps of the method are performed.

29. The method according to claim 6, wherein the non-transitory management module within the cellular communication network manages the connectivity of at least one terminal of the type that can be connected to the cellular communication network, and wherein the non-transitory management module comprises a non-transitory computer program product comprising instructions which, when said instructions are executed by at least one processor, perform the steps of the method, and a downloading means configured to download said non-transitory computer program product to said at least one terminal.

30. The method according to claim 3, wherein the enabling step performed in the terminal is effected by a software application (SIMA) that is executed in the terminal and in which, prior to the sending by the non-transitory management module of the signalling message controlling disconnection of the terminal, the non-transitory management module sends to the terminal a deactivation signal of the software application (SIMA).

31. The method according to claim 3, wherein the non-transitory management module identifies whether a software application (SIMA) that is executed in the terminal and which performs at least the enabling step is active on the terminal, and does not send the signalling message controlling disconnection of the terminal if the software application (SIMA) is active on the terminal.

32. The method according to claim 1, wherein the signalling message sent to the non-transitory connection module is a "MAP-cancel-location" message comprising a termination "cancellation-type" that is positioned at "subscription withdrawn".

\* \* \* \* \*